United States Patent [19]

Ichinokawa et al.

[11] Patent Number: 4,810,838
[45] Date of Patent: Mar. 7, 1989

[54] FREQUENCY COUPLING POSITION COORDINATES DETERMINATION APPARATUS

[75] Inventors: Kazuo Ichinokawa; Yoichi Sato; Tadashi Otsuka, all of Tokyo, Japan

[73] Assignee: NEC Corporation, Japan

[21] Appl. No.: 70,912

[22] Filed: Jul. 8, 1987

[30] Foreign Application Priority Data

Jul. 18, 1986 [JP] Japan ................................. 61-170525

[51] Int. Cl.4 ............................................. G08C 21/00
[52] U.S. Cl. .................................................... 178/19
[58] Field of Search ..................... 178/19, 18; 364/188

[56] References Cited

U.S. PATENT DOCUMENTS 4,644,102 2/1987 Blesser et al. ......................... 178/19

Primary Examiner—Stafford D. Schreyer
Attorney, Agent, or Firm—Laff, Whitesel, Conte & Saret

[57] ABSTRACT

A frequency coupling position coordinates determination apparatus includes sheet means on which N (positive integer) one-turn coils for detecting a magnetic force and M (less than N) signal lines to which at least one predetermined one-turn coil of the N one-turn coils is connected are arranged, and detecting means for detecting the amplitudes of currents respectively flowing through the M signal lines.

5 Claims, 5 Drawing Sheets

FREQUENCY COUPLING POSITION COORDINATES DETERMINATION APPARATUS

BACKGROUND OF THE INVENTION

The present invention relates to a frequency coupling position coordinates determination apparatus using an electromagnetic induction system, or to a daisy type or a data tablet.

In a conventional position coordinates determination apparatus of this type, a current flows through an electromagnetic coil provided to a pen or cursor, and a magnetic flux generated from the electromagnetic coil is detected by a plurality of one-turn coils arranged on a flat plate, thereby determining a position of the pen or cursor on the basis of a detection result.

FIG. 1 shows an example of such a conventional apparatus. A position coordinates determination apparatus shown in FIG. 1 has a circular coil 1 incorporated in a pen or cursor, and N (positive integer) one-turn coils 2-1, 2-2, ..., 2-k, 2-(k+1), ..., 2-(N-1) and 2-N arranged on a printed circuit board 3. The circular coil 1 freely moves on an area 4 of the printed circuit board 3 where coordinate reading is performed. In the example shown in FIG. 1, the circular coil 1 is placed on the one-turn coils 2-k and 2-(k+1). In this case, when a current flows through the circular coil 1, an induced current flows through the one-turn coils 2-k and 2-(k+1) and does not flow through the other one-turn coils. If it is determined whether the induced current flows through the respective one-turn coils or an amplitude of the flowed induced current is determined, a current X position coordinate of the circular coil 1 in the area 4 can be calculated. This conventional apparatus also includes detectors 5-1, 5-2, ..., 5-k, 5-(k-1), ..., 5-N for detecting the amplitude of the above induced current, and a calculator 6 for calculating the current X position coordinate of the circular coil 1 on the basis of the amplitude of the N induced currents detected by the above detectors. The same arrangement as described above is provided with respect to the Y coordinate, so that X and Y position coordinates of the circular coil 1 in the area 4 can be determined.

As described above, the conventional apparatus requires a large number of detectors each constituted by integrated circuits, resulting in a complex and large apparatus.

SUMMARY OF THE INVENTION

It is a principal object of the present invention to provide a position coordinates determination apparatus which eliminates the above conventional drawbacks and which is simple and small in size.

A frequency coupling position coordinates determination apparatus according to the present invention comprises cursor means for generating a magnetic flux of a predetermined frequency with respect to a position of said cursor on the sheet means the coordinates of the position of the cursor means on the sheet means being the coordinates which are to be determined by said apparatus, a plurality of one-turn coils, arranged on the sheet means, for detecting the magnetic flux generated by the cursor means, signal lines connected to the plurality of one-turn coils in predetermined correspondence, the signal lines being smaller in number than that of the plurality of one-turn coils, detecting means for detecting a current flowing through the respective signal lines, and calculating means for calculating position coordinates of the cursor means on the sheet means on the basis of an output from the detecting means.

DETAILED DESCRIPTION OF THE PREFERRED EMBODIMENT

The present invention will be described in detail with reference to the accompanying drawings.

Figure 1:
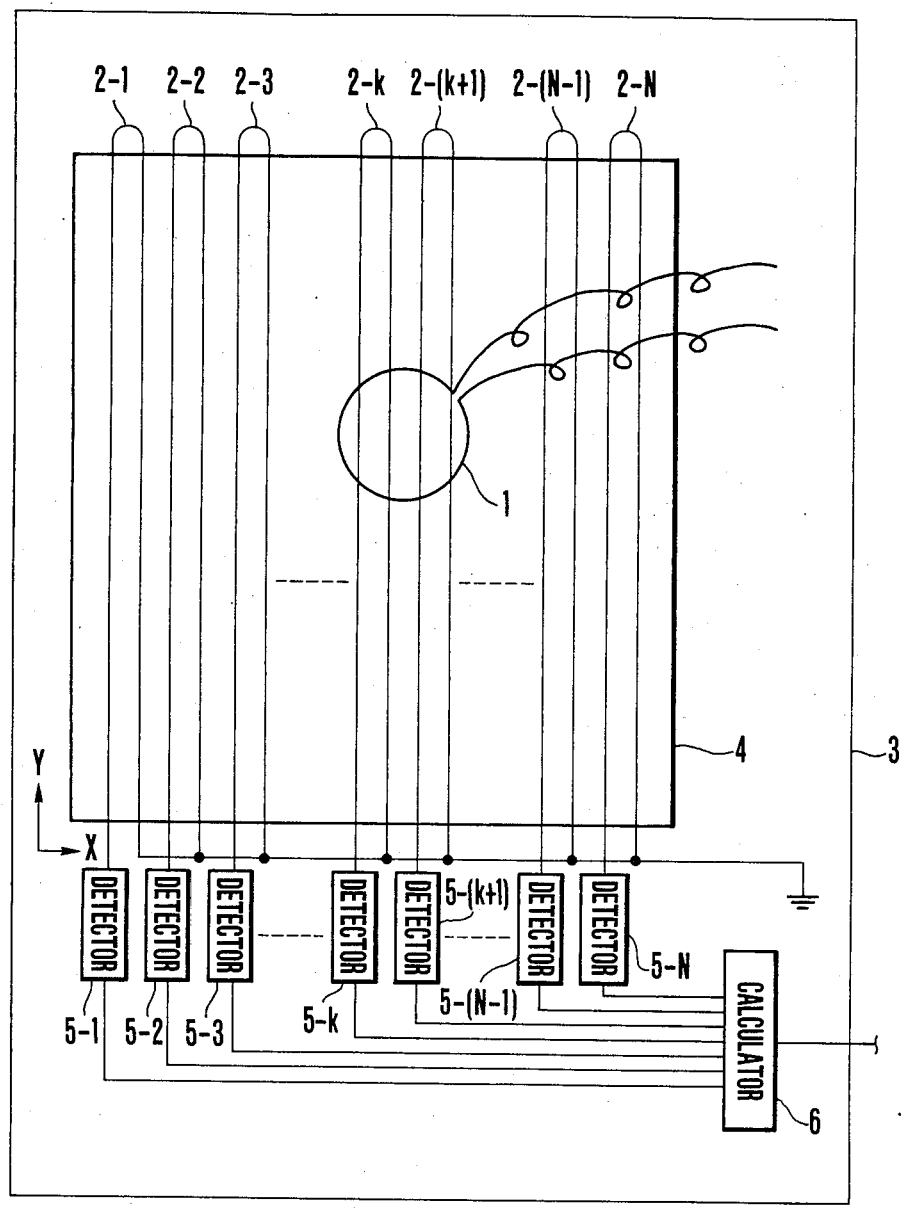
FIG. 1 is a block diagram showing a conventional apparatus.
Figure 2:
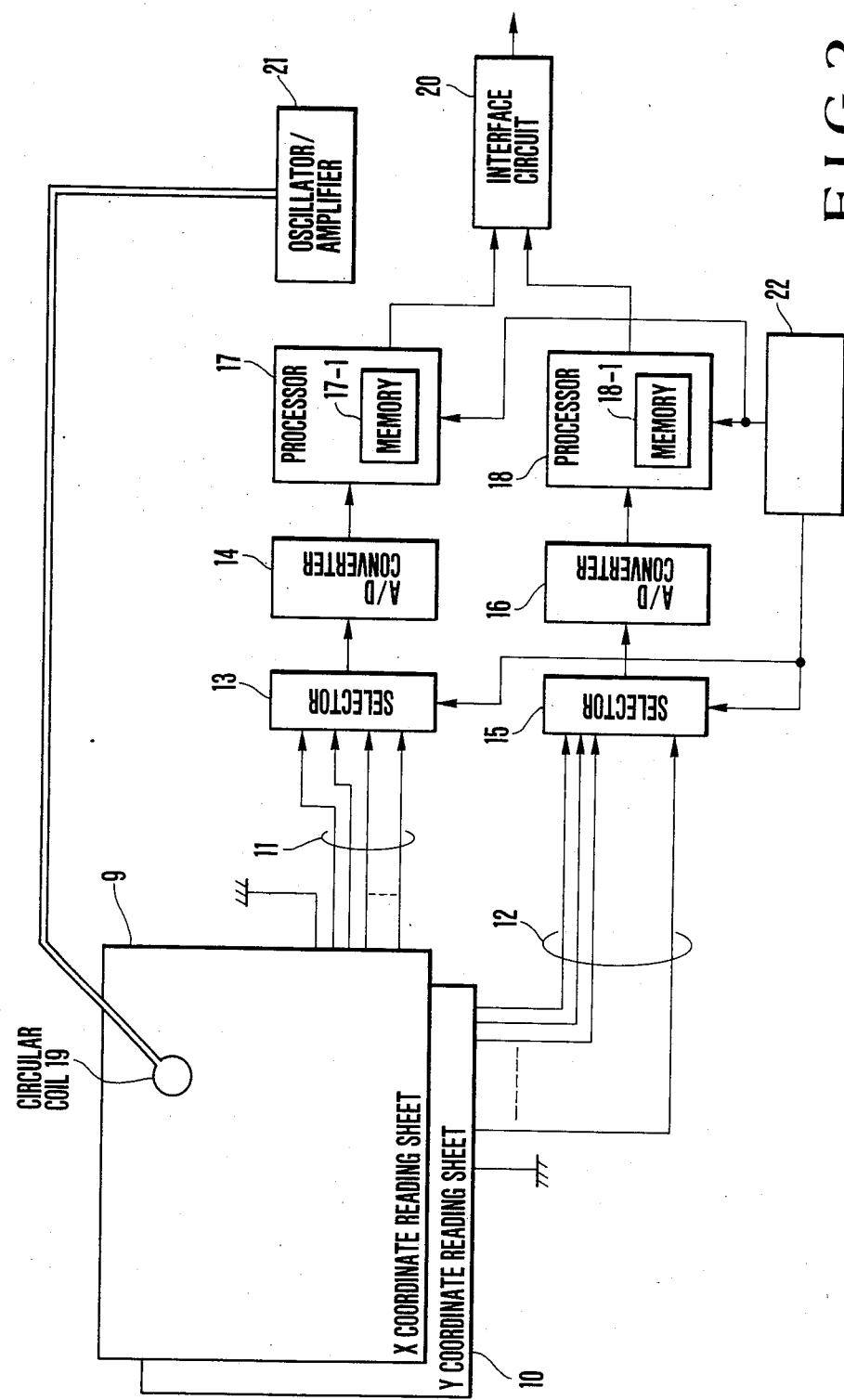
FIG. 2 is a block diagram showing an arrangement of an embodiment of the present invention.

A position coordinates determination apparatus according to the present invention shown in FIG. 2 is constituted by an X coordinate reading sheet 9 having N X-axis one-turn coils and a bus 11 consisting of M signal lines connected to the X-axis one-turn coils as described later, a Y coordinate reading sheet 10 having N Y-axis one-turn coils and a bus 12 consisting of M signal lines connected to the Y-axis one-turn coils, a selector 13, connected to the signal lines of the bus 11, for selecting one of the signal lines, an A/D converter 14 for converting a value of an output current or voltage from the selector 13 into a digital value, a selector 15, connected to the signal lines of the bus 12, for selecting one of the signal lines, an A/D converter 16 for converting a value of an output voltage from the selector 15 into a digital value, processors 17 and 18, each incorporating a memory, for calculating X and Y position coordinates on the basis of outputs from the A/D converters 14 and 15, respectively, an interface circuit 20 for supplying X and Y position coordinates obtained by the processors 17 and 18 to a calculator (not shown), a circular coil 19, an oscillation amplifier 21 for flowing an AC current to the circular coil 19, and a clock generator 22 for supplying clock signals to the selectors 13 and 15, the A/D converters 14 and 16, and the processors 17 and 18.

Figure 3:
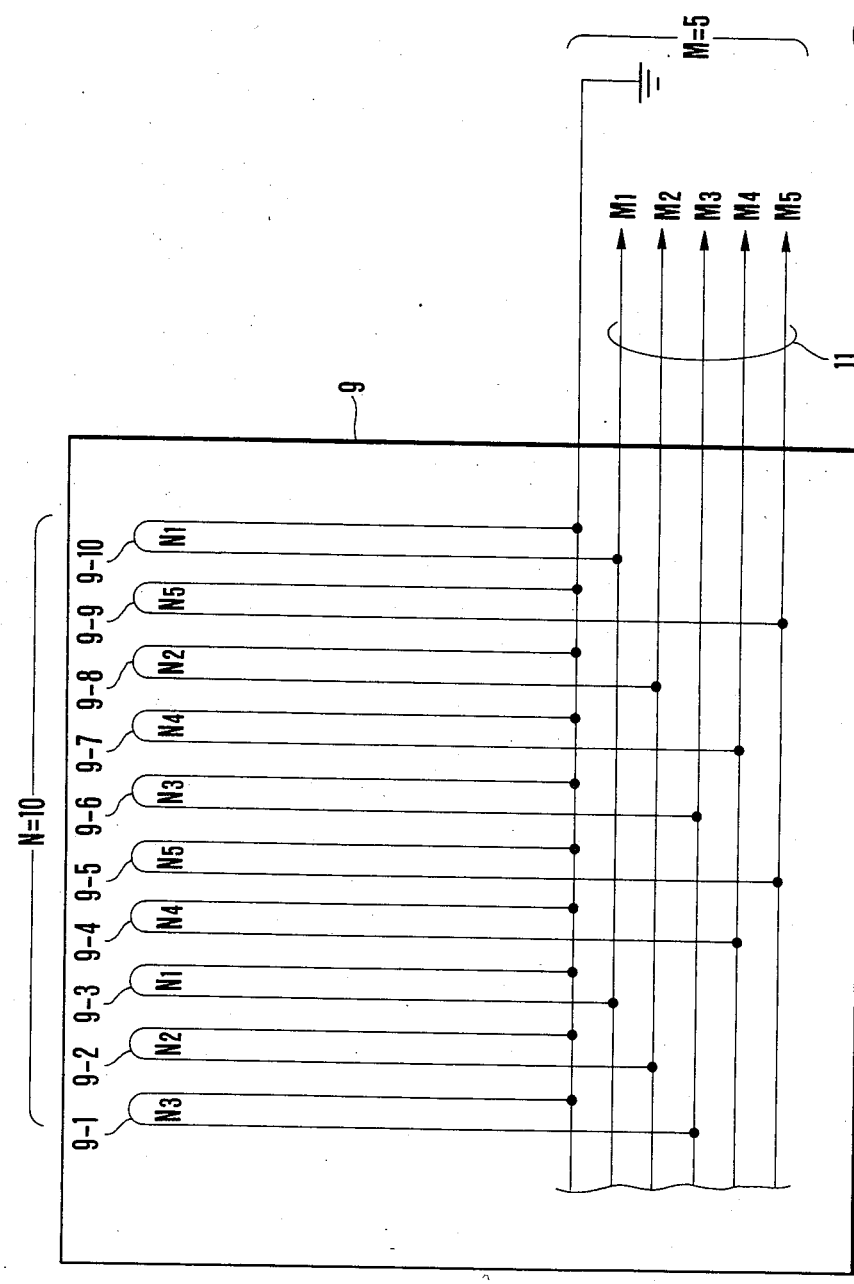
FIG. 3 is a diagram showing an arrangement of a sheet 9 shown in FIG. 2.

FIG. 3 shows an arrangement of the X coordinate reading sheet 9. In FIG. 3, the number N of the one-turn coils is 10, and the number M of the signal lines of the bus 11 is 5. Numbers $M_1$ to $M_5$ are assigned to the signal lines, respectively. Numbers $N_3$, $N_2$, $N_1$, $N_4$, $N_5$, $N_3$, $N_4$, $N_2$, $N_5$, and $N_1$ (to be referred to as a number row hereinafter) are assigned to the 10 one-turn coils 9-1 to 9-10, respectively, from the leftmost coil in FIG. 3. Each pair of one-turn coils assigned with the same number is connected to a corresponding one of the signal lines $M_1$ to $M_5$ assigned with the same number. In addition, intervals between the one-turn coils 9-1 to 9-10 are set such that two of the one-turn coils 9-1 to 9-10 are always located immediately below the circular coil 19. The above-mentioned number row has the following characteristic. That is, the same combination is not obtained by numbers of any adjacent two one-turn coils 9-i and 9-(i+1). Therefore, if the processor 17 determines two signal lines of the 5 signal lines $M_1$ to $M_5$ which detect the induced current, two one-turn coils of the one-turn coils 9-1 to 9-10 on which the circular coil 19 is located can be determined.

Figure 4:
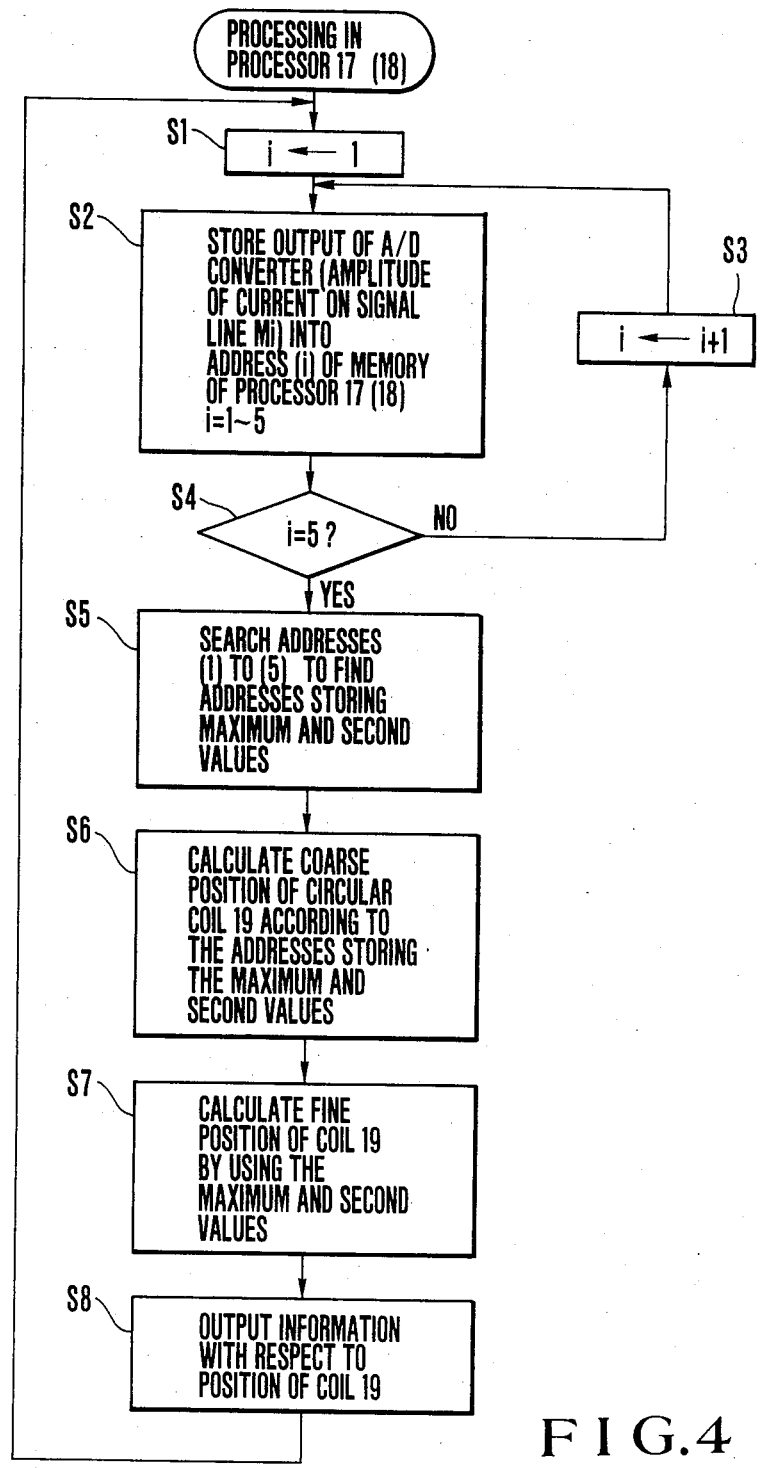
FIG. 4 is a flow chart for explaining an operation of the apparatus shown in FIG. 2.

FIG. 4 is a flow chart for determining position coordinates of the circular coil 19 executed in the processor 17. In steps S1 to S5 fo FIG. 4, an amplitude of current of the signal line $M_i$ (i=1 to 5) in the bus 11 is A/D-converted by the A/D converter 14 and then sequentially stored in an address (i: i=1 to 5) of a memory 17-1 in the processor 17. In step S5, the memory 17-1 is searched to find addresses m and n storing the maximum and second values. In step S6, coarse position coordinates of the circular coil 19 are calculated according to the addresses m and n. Therefore, a position of the circular coil 19 can be first determined with an accuracy of an interval between the one-turn coils.

Then, in step S7, a ratio of the induced currents detected by two signal lines is obtained on the basis of the above maximum and second values, thereby calculating a fine position of the circular coil 19.

Figure 5:
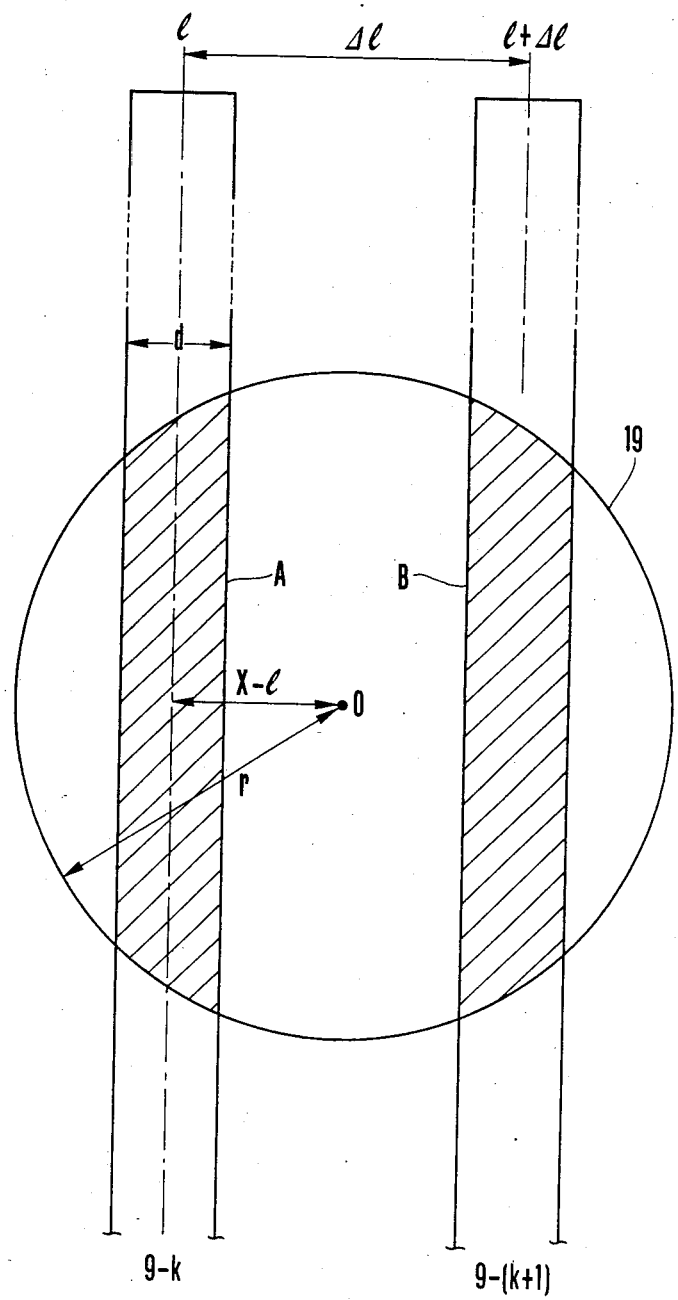
FIG. 5 is a view for explaining a principle of coordinates calculation of the apparatus shown in FIG. 2.

A method of accurately calculating central coordinates of each one-turn coil in accordance with a ratio of induced currents detected by the one-turn coils will be described below. FIG. 5 shows a state wherein the circular coil 19 is located across one-turn coils 9-k and 9-(k+1). A hatched portion A is a portion of the one-turn coil 9-k immediately below the circular coil 19, and a hatched portion B is a portion of the one-turn coil 9-(k+1) immediately below the circular coil 19. An area ratio of the hatched portions A and B equals to a ratio of amplitudes of induced currents respectively flowing through the one-turn coils 9-k and 9-(k+1). Therefore, assuming that an X coordinate of a center O of the circular coil 19 is x, a radius thereof is r, an X coordinate of the central line of the one-turn coil 9-k is l, an X coordinate of a central line of the one-turn coil 9-(k+1) is (l+Δl), and each width of the one-turn coils 9-k and 9-(k+1) is d, a relationship between the ratio A/B of the areas A and B and (x-l) is determined. Calculating means for converting the relationship into numerals and stores it in, e.g., a ROM (Read Only Memory) in the processor 17, and calculating (x-l) in accordance with the ratio A/B can be easily arranged. This principle can be similarly applied to the case wherein three or more one-turn coils are always present immediately below the circular coil 19, and the coordinates can be calculated in accordance with a formula as described above. The X coordinate of the circular coil 19 obtained in this manner is output as a position coordinate through the interface circuit 20.

The description has been made with reference to the X coordinate, but the Y coordinate can be obtained in the processor 18 using the same principle and the arrangement as those of the processor 17.

It is advantageous in designing the apparatus to increase the number N of the one-turn coils and to decrease the number M of the signal lines as much as possible. A problem of obtaining N and M is to mathematically obtain a series of the maximum length (N) under the condition that all of the R symbol partial rows have different combinations in a series of a length N and consisting of M symbols. This problem mathematically belongs to problems having no systematic algorithm and hence can be obtained only by a one by one calculation using a calculator. Note that R is the number of the one-turn coils located immediately below the circular coil 19, and R=2 in the above embodiment. Practically, N must be about 30, and R=3. In this case, the following connection table can be obtained.

As has been described above, according to the present invention, the number of signal lines of a bus and that of A/D converters can be decreased, so that the entire apparatus can be made smaller in size.

| Numbers of One-Turn Coils | Numbers of Signal Lines |
| --- | --- |
| (1) | 4 |
| (2) | 3 |
| (3) | 2 |
| (4) | 6 |
| (5) | 7 |
| (6) | 4 |
| (7) | 5 |
| (8) | 6 |
| (9) | 7 |
| (10) | 1 |
| (11) | 2 |
| (12) | 5 |
| (13) | 3 |
| (14) | 4 |
| (15) | 6 |
| (16) | 1 |
| (17) | 2 |
| (18) | 3 |
| (19) | 7 |
| (20) | 4 |
| (21) | 1 |
| (22) | 3 |
| (23) | 5 |
| (24) | 6 |
| (25) | 1 |
| (26) | 3 |
| (27) | 7 |
| (28) | 5 |
| (29) | 1 |
| (30) | 4 |
| (31) | 2 |

What is claimed is:

1. A frequency coupling, position coordinates determination apparatus comprising:
   cursor means for generating a magnetic flux of a predetermined frequency with respect to a position of said cursor on a sheet means, coordinates of said position of said cursor means on said sheet means being the coordinates which are to be determined by said apparatus;
   a number of one-turn coils, arranged parallel to each other at an equal interval on said sheet means, for detecting the magnetic flux generated by said cursor means, the interval being set such that P one-turn coils of said plurality of one-turn coils are covered by said cursor means;
   a number of signal lines which are fewer than the number of said plurality of one-turn coils and which are connected to said plurality of one-turn coils in a predetermined correspondence set such that a combination of said signal lines to which given adjacent P one-turn coils are connected differs from a combination of said signal lines to which other given adjacent P one-turn coils are connected;
   detecting means for detecting a current flowing through said respective signal lines; and
   calculating means for calculating the position coordinates of said cursor means on said sheet means on the basis of an output from said detecting means.

2. A frequency coupling, position coordinates determination apparatus comprising:
   cursor means for generating a magnetic flux of a predetermined frequency with respect to a position of said cursor on a sheet means, coordinates of the position of said cursor means on said sheet means being the coordinates which are to be determined by said apparatus;

a number of one-turn coils, arranged parallel to each other at an equal interval on said sheet means, for detecting the magnetic flux generated by said cursor means, the interval being set such that P one-turn coils of said plurality of one-turn coils are covered by said cursor means;

a number of signal lines which are fewer than the number of said plurality of one-turn coils and which are connected to said plurality of one-turn coils in a predetermined correspondence set such that a combination of said signal lines to which given adjacent P one-turn coils are connected differs from a combination of said signal lines to which other given adjacent P one-turn coils are connected;

detecting means for detecting a current flowing through said respective signal lines;

calculating means for calculating the position coordinates of said cursor means on said sheet means, said calculating means including means for determining a course of position coordinates of said cursor means on said sheet means by comparing amplitudes of currents flowing through the respective given adjacent P one-turn coils of said plurality of one-turn coils.

3. A frequency coupling position coordinates determination apparatus comprising:

cursor means for generating a magnetic flux of a predetermined frequency with respect to a position of said cursor on a sheet means, coordinates of said position of the cursor means on said sheet means being the coordinates which are to be determined by said apparatus;

a number of one-turn coils, arranged parallel to each other at an equal interval on said sheet means, for detecting the magnetic flux generated by said cursor means, the interval being set such that P one-turn coils of said plurality of one-turn coils are covered by said cursor means;

a number of signal lines which are fewer than the number of said plurality of one-turn coils and which are connected to said plurality of one-turn coils in a predetermined correspondence set such that a combination of said signal lines to which given adjacent P one-turn coils are connected differs from a combination of said signal lines to which other given adjacent P one-turn coils are connected;

detecting means for detecting a current flowing through said respective signal lines;

calculating means for calculating position coordinates of said cursor means on said sheet means, said calculating means including means for obtaining an area ratio of the one-turn coils located below said cursor means on a basis of the currents flowing through the respective one-turn coils, memory means for storing a relationship between the area ratio and position coordinates, and means for supplying an output from said area ratio obtaining means to said memory means to obtain fine position coordinates of said cursor means.

4. A frequency coupling, position coordinates determination apparatus comprising:

cursor means for generating a magnetic flux of a predetermined frequency with respect to a position of said cursor on sheet means, coordinates of the position of said cursor means on said sheet means being the coordinates to be determined by said apparatus;

a number of one-turn coils, arranged parallel to each other at an equal interval on said sheet means, for detecting the magnetic flux generated by said cursor means, the interval being set such that P one-turn coils of said plurality of one-turn coils are covered by said cursor means;

a number of signal lines which are fewer than the number of said plurality of one-turn coils and which are connected to said plurality of one-turn coils in a predetermined correspondence set such that a combination of said signal lines to which given adjacent P one-turn coils are connected differs from a combination of said signal lines to which other given adjacent P one-turn coils are connected;

detecting means for detecting a current flowing through said respective signal lines;

first calculating means for calculating a course of the position coordinates of said cursor means on said sheet means by comparing amplitudes of currents flowing through the respective given adjacent P one-turn coils of said plurality of one-turn coils; and second calculating means for calculating fine position coordinates of said cursor means, said second calculating means including means for obtaining an area ratio of the one-turn coils located below said cursor means on the basis of the currents flowing through the respective one-turn coils, memory means for storing a relationship between the area ratio and position coordinates, and means for supplying an output from said area ratio obtaining means to said memory means to obtain the fine position coordinates of said cursor means.

5. A frequency coupling position coordinates determination apparatus comprising:

first and second sheets which are stacked;

a cursor for generating a magnetic flux of a predetermined frequency with respect to said sheets;

a number of X coordinate one-turn coils, arranged parallel to each other on said first sheet, for detecting the magnetic flux generated by said cursor;

a number of Y coordinate one-turn coils, arranged parallel to each other on said second sheet and perpendicular to said plurality of X coordinate one-turn coils, for detecting the magnetic flux generated by said cursor;

first and second signal lines which are fewer than the number of said plurality of X coordinate and Y coordinate one-turn coils, respectively, and which are connected to said plurality of X coordinate and Y coordinate one-turn coils in a predetermined correspondence, respectively, said predetermined correspondence being set such that a combination of said first signal lines to which a given adjacent P X coordinate one-turn coils are connected differs from a combination of said first signal lines to which another given adjacent P X coordinate one-turn coils are connected, and a combination of said second signal lines to which a given adjacent P Y coordinate one-turn coils are connected differs from a combination of said second signal lines to which another given adjacent P Y coordinate one-turn coils are connected;

detecting means for detecting a current flowing through said first and second signal lines; and calculating means for calculating X and Y position coordinates of said cursor means on said first and second sheets on the basis of an output of said detecting means.

* * * * *